United States Patent
Yoo (10) Patent No.: US 10,933,913 B2
(45) Date of Patent: Mar. 2, 2021

(54) APPARATUS AND METHOD FOR ESTIMATING STEERING ANGLE OF MOTOR DRIVEN POWER STEERING

(71) Applicant: HYUNDAI MOBIS CO., LTD., Seoul (KR)

(72) Inventor: Ji Hoon Yoo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 492 days.

(21) Appl. No.: 15/898,776

(22) Filed: Feb. 19, 2018

(65) Prior Publication Data

US 2018/0237068 A1    Aug. 23, 2018

(30) Foreign Application Priority Data

Feb. 20, 2017    (KR) ................. 10-2017-0022510

(51) Int. Cl.
   *B62D 15/02*    (2006.01)
   *B60W 10/20*    (2006.01)
   *B62D 6/10*    (2006.01)
   *G01D 5/14*    (2006.01)

(52) U.S. Cl.
   CPC ......... *B62D 15/0215* (2013.01); *B60W 10/20* (2013.01); *B62D 6/10* (2013.01); *B62D 15/0235* (2013.01); *B62D 15/0245* (2013.01); *B60W 2540/18* (2013.01); *G01D 5/145* (2013.01)

(58) Field of Classification Search
   CPC .. B62D 15/0215; B62D 6/10; B62D 15/0235; B62D 15/0245; B60W 10/20; B60W 2540/18; G01D 5/145
   USPC .......................................................... 701/41
   See application file for complete search history.

(56) References Cited

U.S. PATENT DOCUMENTS

| 8,967,321 | B2  | 3/2015 | Banno et al. |
| 2002/0112913 | A1* | 8/2002 | Chen ............. B62D 5/0463 180/443 |
| 2005/0188690 | A1* | 9/2005 | Namuduri ......... B62D 5/065 60/435 |

(Continued)

FOREIGN PATENT DOCUMENTS

| CN | 104210532 | 12/2014 |
| JP | 5941871 | 6/2016 |

(Continued)

OTHER PUBLICATIONS

Office Action dated Jun. 18, 2020 from the Chinese Patent Office for Chinese Patent Application No. 201810153250.7.

*Primary Examiner* — Paula L Schneider
(74) *Attorney, Agent, or Firm* — H.C. Park & Associates, PLC (57) ABSTRACT

An apparatus for estimating a steering angle of MDPS including: a motor of an MDPS, corresponding to rotation of a steering wheel; an amplifier configured to amplify a specific level of counter electromotive force to a preset level and output the amplified voltage, the specific level of counter electromotive force being generated by the motor when the steering wheel is manually operated; a switch configured to be turned on by the amplified voltage outputted from the amplifier; a power supply configured to be turned on by the switch and supply power to the MDPS; and a control unit of the MDPS configured to be driven by the supplied power and estimate a steering angle of the steering wheel, which is manually operated.

16 Claims, 6 Drawing Sheets

(56) References Cited

U.S. PATENT DOCUMENTS

2008/0119986 A1* 5/2008 Wei ...................... G01D 5/145
701/41

FOREIGN PATENT DOCUMENTS

KR       10-0863096      10/2008
KR    10-2010-0036084     4/2010

* cited by examiner

APPARATUS AND METHOD FOR ESTIMATING STEERING ANGLE OF MOTOR DRIVEN POWER STEERING

CROSS-REFERENCE TO RELATED APPLICATION

This application claims priority from and the benefit of Korean Patent Application No. 10-2017-0022510, filed on Feb. 20, 2017, which is hereby incorporated by reference for all purposes as if set forth herein.

BACKGROUND

Field

Exemplary embodiments relate to an apparatus and method for estimating a steering angle of MDPS ("Motor Driven Power Steering"). More particularly, exemplary embodiments relate to an apparatus and method for estimating a steering angle of MDPS, which is capable of stably estimating an absolute steering angle by detecting a relative rotation angle of is a steering wheel without a steering angle sensor mounted in the MDPS.

Discussion of the Background

Recently, more and more vehicles have the MDPS mounted therein as an assisted steering mechanism.

The MDPS is also referred to as EPS ("Electronic Power Steering"), and provides a driving force using an electric motor in place of hydraulic pressure, the driving force assisting a force applied to a steering wheel during a steering operation.

The MDPS is a technique for controlling the entire MDPS system through an ECU ("Electronic Control Unit"). The MDPS detects direction, angle, angular speed, and torque information using sensors and sends the detected information to the ECU, and the ECU systemizes the information into formulas and drives the motor through tuning logic optimized according to a driver's intention.

The MDPS includes a steering angle sensor to detect the steering angle information of the steering wheel.

The steering angle information is important information which is required for vehicle control, not only by the MDPS but also by other systems in the vehicle. However, the steering angle sensor has a relatively high price and increases the weight of the vehicle, compared to the function performed by the steering angle sensor to detect the steering angle information.

The most important reason to use the steering angle sensor is in order to detect an absolute steering angle of the steering wheel, instead of a relative steering angle thereof. In general, however, the zero-point setting of the absolute steering angle in the MDPS is performed during an alignment process. Thus, if the MDPS is not powered off, all steering angles after the is zero-point setting can be calculated by a position sensor of the motor. Therefore, the steering angle sensor does not need to be mounted. In reality, however, when a driver turns off the ignition of the vehicle, power, which has been supplied to the MDPS to prevent a discharge of the battery, is also cut off. If the driver rotates the steering wheel after the MDPS is powered off, the MDPS cannot recognize the rotation angle. Therefore, the steering angle sensor is mounted.

As described above, however, the steering angle sensor has a relatively high price and increases the weight of the vehicle, compared to the function performed by the steering angle sensor. Therefore, there is a demand for a method capable of stably estimating a steering angle without a steering angle sensor.

The related art is disclosed in Korean Patent Registration No. 10-0863096 published on Oct. 6, 2008 and entitled "Steering Angle Detection Apparatus").

The above information disclosed in this Background section is only for enhancement of understanding of the background of the invention and, therefore, it may contain information that does not constitute prior art.

SUMMARY

Exemplary embodiments of the present invention provide an apparatus and method for estimating a steering angle of MDPS, which is capable of stably estimating an absolute steering angle by detecting a relative rotation angle of a steering wheel without a steering angle sensor mounted in the MDPS.

Additional features of the invention will be set forth in the description which follows, and in part will be apparent from the description, or may be learned by practice of the invention.

An exemplary embodiment of the present invention discloses an apparatus for estimating a steering angle of MDPS including: a motor of an MDPS, corresponding to rotation of a steering wheel; an amplifier configured to amplify a specific level of counter electromotive force to a preset level and output the amplified voltage, the specific level of counter electromotive force being generated by the motor when the steering wheel is manually operated; a switch configured to be turned on by the amplified voltage outputted from the amplifier; a power supply configured to be turned on by the switch and supply power to the MDPS; and a control unit of the MDPS configured to be driven by the supplied power and estimate a steering angle of the steering wheel which is manually operated.

The amplifier may receive power from a battery while the MDPS is turned off.

The switch may include an electronic switch which is not turned on by a smaller voltage than the voltage level outputted from the amplifier.

While the MDPS is turned on, the control unit of the MDPS may continuously detect a relative rotation angle of the steering angle using a motor position sensor that detects a motor position of the MDPS, and estimate a final steering angle based on a final value of the detected relative rotation angle and a previous value of the final steering angle stored in a memory.

In response to completion of the manual operation of the steering wheel, the control unit of the MDPS may store the estimated final steering angle in a memory, and then be turned off.

In response to a change of the steering angle being equal to or less than a preset value for a preset time or more or a torque change being equal to or less than a preset value, the control unit of the MDPS may determine that the manual operation of the steering wheel is completed.

Another exemplary embodiment of the present invention discloses a method for estimating a steering angle of MDPS, including: detecting, by a control unit of the MDPS, a relative rotation angle of an MDPS motor rotated in connection with a steering wheel using a motor position sensor, as the control unit of the MDPS is turned on by power supplied thereto in response to the steering wheel being operated while the MDPS is turned off; estimating, by the control unit of the MDPS, a steering angle of the steering wheel based on the detected relative rotation angle, while the steering wheel is operated; estimating, by the control unit of the MDPS, a final steering angle and storing the estimated final steering angle in a memory based on the detected relative rotation angle, in response to completion of the operation of the steering wheel; and turning off the control unit of the MDPS after the final steering angle is stored in the memory.

In order to turn on the control unit of the MDPS, an amplifier of an apparatus for estimating a steering angle of MDPS may amplify a counter electromotive force generated by the MDPS motor to a preset level or more and output the amplified voltage to a switch, the switch may be turned on by the amplified voltage and turns on a power supply, and the power supply may supply power to the MDPS.

In order to estimate the final steering angle, while the MDPS is turned on, the control unit of the MDPS continuously may detect the relative rotation angle of the steering wheel using the motor position sensor that detects the motor position of the MDPS, and estimate the final steering angle based on a final value of the detected relative rotation angle and a previous value of the final steering angle stored in the memory.

In response to a change of the steering angle being equal to or less than a preset value for a preset time or more or a torque change being equal to or less than a preset value, the control unit of the MDPS may determine that the operation of the steering wheel is completed.

After the control unit of the MDPS is turned on by power supplied thereto, the control unit of the MDPS may check whether a vehicle battery has been removed or discharged, and disable a restoring operation of the steering wheel or apply a smaller restoring force than a normal restoring force in response to the vehicle battery being removed or discharged. When the absolute steering angle of the MDPS is reset, the control unit may enable the restoring operation of the steering wheel or return the restoring force to the normal restoring force.

In order to check whether the vehicle battery has been removed or discharged, the control unit of the MDPS may receive information on whether the battery has been discharged, from another system connected through communication in a vehicle, or the MDPS may include a separate check circuit therein. The check circuit may include a circuit in which a flag of a memory is set to a first value while battery power is supplied, and then changed to a second value when the battery power is not supplied due to a removal or discharge of the battery.

Another exemplary embodiment of the present invention discloses a method for estimating a steering angle of MDPS, including: reading, by a control unit of the MDPS, a previous final steering angle stored in a memory when the MDPS was turned off, as the control unit of the MDPS is turned on by power supplied thereto in response to the steering wheel being operated while the MDPS is turned off; detecting, by the control unit of the MDPS, an absolute steering angle of the steering wheel rotated until the MDPS is turned on, through a narrow-range steering angle sensor; and calculating, by the control unit of the MDPS, the current final steering angle by adding the detected absolute steering angle to the previous final steering angle read from the memory.

The narrow-range steering angle sensor may include a sensor capable of detecting an absolute steering angle in a narrower range than a full-range steering angle sensor.

In another embodiment, a method for estimating a steering angle of MDPS may include: reading, by a low-current MCU, two or more motor phase voltages, the low-current MCU continuously maintaining an on-state even while the MDPS is turned off by turn-off of an ignition of a vehicle; checking, by the low-current MCU, whether a difference between any one phase voltage and another phase voltage is equal to or more than a designated value; reading, by the low-current MCU, a motor position sensor value by supplying power to a motor position sensor, when the check result indicates that the voltage difference is equal to or more than the designated value; calculating and accumulating, by the low-current MCU, rotation angles of the motor according to the motor position sensor value; and deciding, by a main MCU, a current steering angle by adding the rotating angle of the motor, accumulated by the low-current MCU while the ignition was turned off, to the final steering angle which has been stored in a memory when the ignition was turned off, the main MCU being operated as the ignition is turned on.

When the difference between any one phase voltage and another phase voltage is equal to or more than the designated value, the low-current MCU may determine that a steering wheel is operated.

When the motor is not rotated for a predefined time, the low-current MCU may turn off the motor position sensor by stopping power supply to the motor position sensor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an apparatus and method for estimating a steering angle of MDPS in accordance with exemplary embodiments of the present invention be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
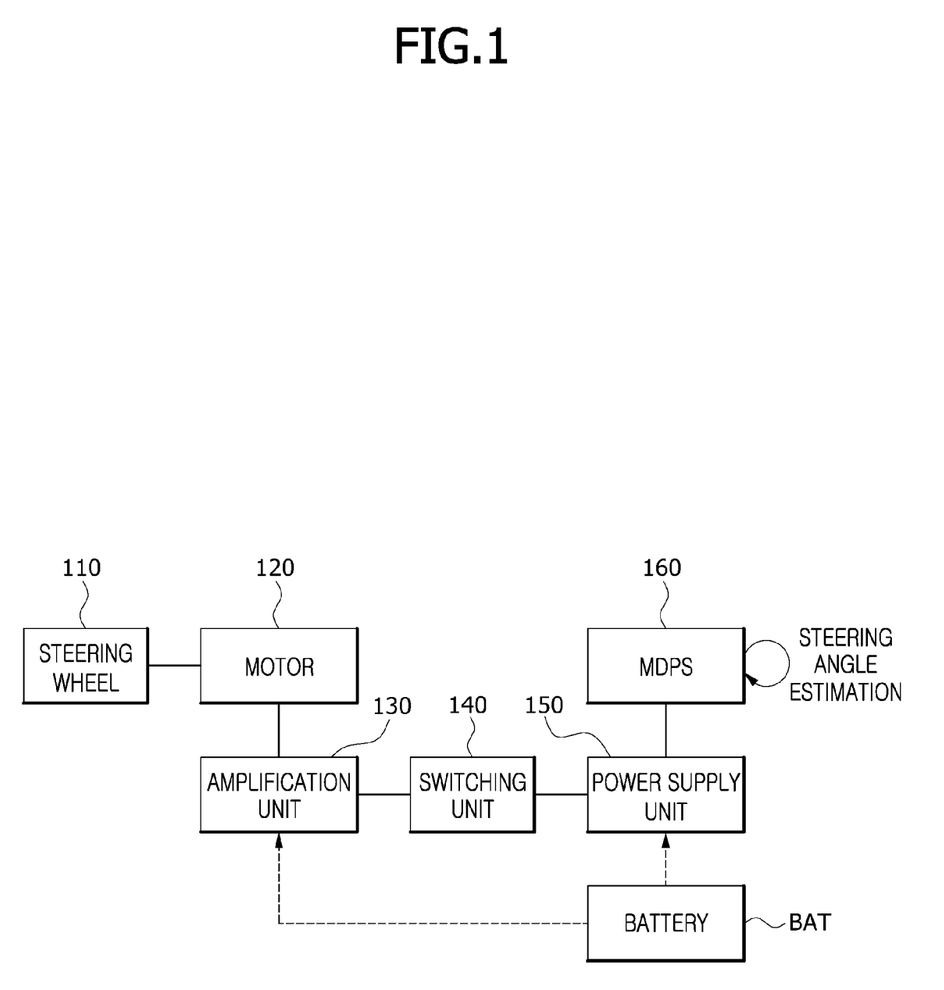
FIG. 1 is a diagram illustrating a schematic configuration of an apparatus for estimating a steering angle of MDPS in accordance with an exemplary embodiment of the present invention.

FIG. 1 is a diagram illustrating a schematic configuration of an apparatus for estimating a steering angle of MDPS in accordance with an exemplary embodiment of the present invention.

As illustrated in FIG. 1, the apparatus for estimating a steering angle of MDPS in accordance with an exemplary embodiment of the present invention may include a steering wheel 110, a motor 120, an amplifier 130, a switch 140, a power supply 150 and an MDPS 160. When the steering wheel 110 is operated while the MDPS 160 is turned off, the MDPS 160 may be turned on by power supplied thereto. Then, the turned-on MDPS 160 or an internal control unit of the MDPS 160 may calculate a steering angle by detecting a relative rotation angle of the motor 120 (or a motor of the MDPS 160, which corresponds to the rotation of the steering wheel).

At this time, the MDPS 160 may not include a steering angle sensor (for example, full-range steering angle sensor) mounted therein. The full range may indicate approximate 1,080 degrees.

More specifically, the motor 120 is a motor of the MDPS 160, which corresponds to a rotation of the steering wheel 110. While the MDPS 160 is turned on, the motor 120 may generate an assisting force to assist a force applied to the steering wheel during steering. However, while the MDPS 160 is turned off, a specific level of counter electromotive force or phase voltage may be generated at each phase of the motor, when a driver manually rotates the steering wheel 110. For example, the phase may indicate any one phase of a three-phase motor, and the specific level may range from several tens of mV to several hundreds of mV.

The level of the counter electromotive force or phase voltage may be slightly different depending on the rotation speed of the motor 120 or the speed to rotate the steering wheel, but have no significant influence on the operation of the apparatus for estimating a steering angle of MDPS in accordance with the present exemplary embodiment.

The amplifier 130 may amplify the counter electromotive force or phase voltage generated by the motor 120 to a preset level (for example, several V). That is, although the steering wheel 110 may be slightly moved, the amplifier 130 may amplify a counter electromotive force generated at this time to the preset level or more, and output the amplified counter electromotive force.

The amplifier 130 may receive power from a battery BAT even while the MDPS 160 is turned off. At this time, since the amplifier 130 consumes a very small amount of current in a standby state, the amplifier 130 may have no significant influence on a discharge of the battery BAT.

The switch 140 is an electronic switch that is turned on by the amplified voltage (for example, several V) outputted from the amplifier 130.

The switch 140 may not be switched by a smaller voltage than the amplified voltage.

The power supply 150 may rectify the voltage of the battery BAT to a preset level, and supply the rectified voltage to the MDPS 160.

The power supply 150 may be turned on by the switch 140.

That is, although the ignition switch of the vehicle is not turned on, the power supply 150 may be turned on by the turned-on switch 140, and supply a driving voltage to the MDPS 160 or the internal control unit of the MDPS. However, the driving voltage supplied to the MDPS 160 is not used to generate an assisting force.

Figure 2:
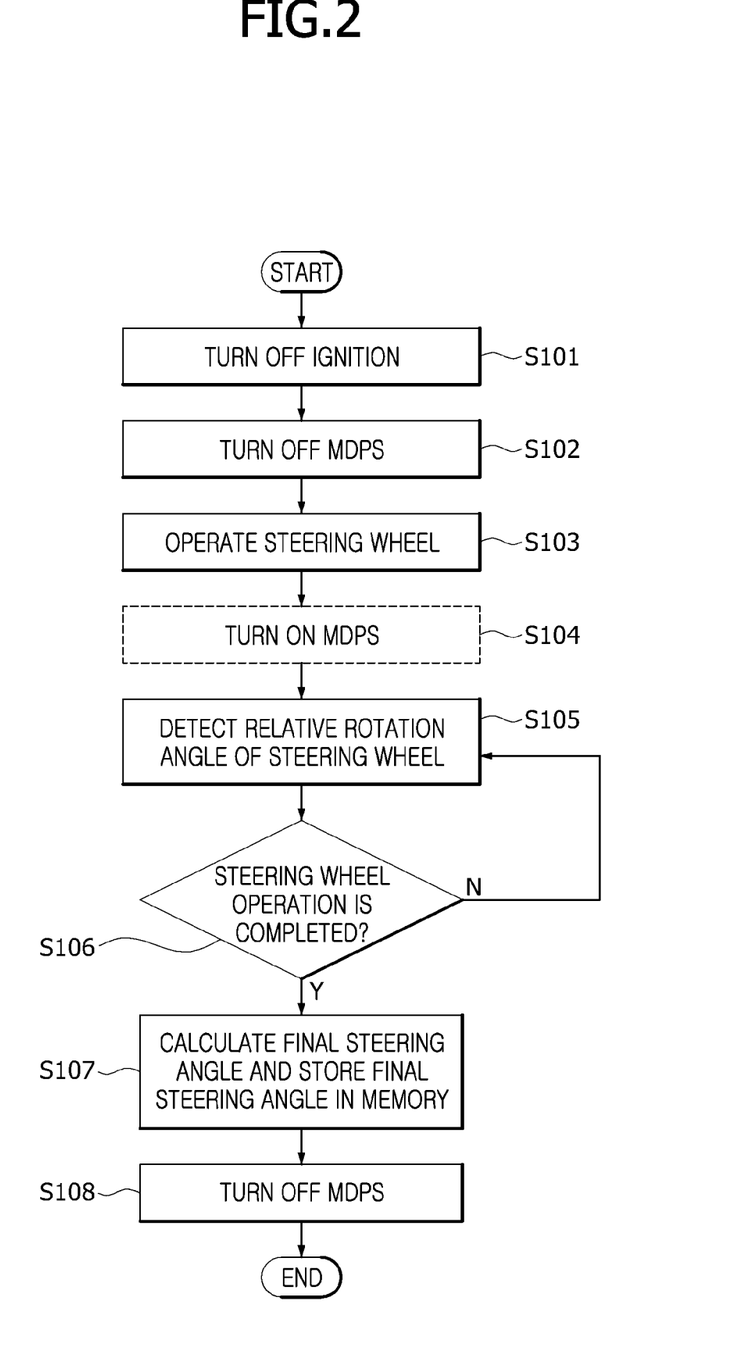
FIG. 2 is a flowchart for describing a method for estimating a steering angle of MDPS in accordance with an exemplary embodiment of the present invention.
Figure 3:
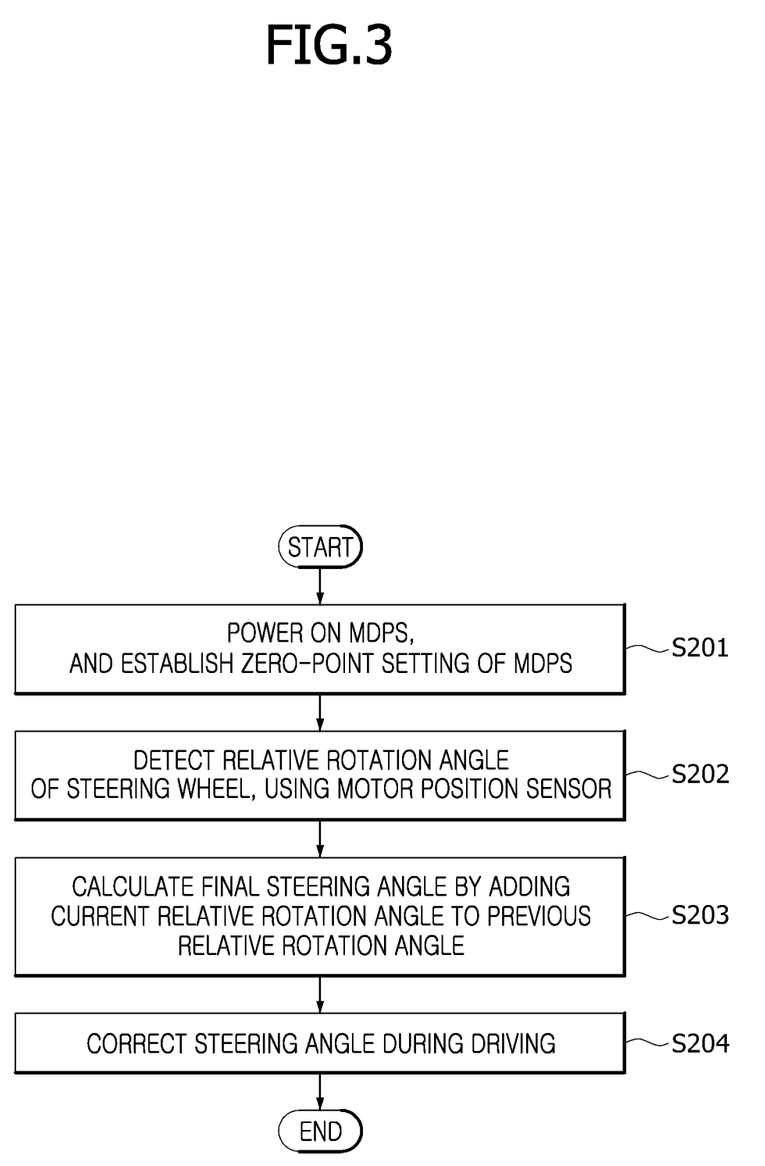
FIG. 3 is a flowchart for describing a method for estimating a steering angle using a relative rotation angle of a motor without a steering angle sensor, in FIG. 2.

When the driving voltage is supplied, the MDPS 160 or the internal control unit of the MDPS may estimate a steering angle of the steering wheel 110, which is manually operated without an assisting force of the MDPS, according to a method for estimating a steering angle in accordance with an exemplary embodiment of the present invention (refer to FIGS. 2 and 3).

Hereafter, the method for estimating a steering angle of MDPS in accordance with an exemplary embodiment of the present invention will be described in more detail with reference to FIGS. 2 and 3.

FIG. 2 is a flowchart for describing the method for estimating a steering angle of MDPS in accordance with an exemplary embodiment of the present invention.

As illustrated in FIG. 2, when the ignition of the vehicle is turned off at step S101, the MDPS 160 may be turned off at step S102.

When the steering wheel 110 is manually operated at step S103 without an assisting force of the MDPS while the MDPS 160 is turned off, the motor 120, which is rotated in connection with the steering wheel 110, or the motor of the MDPS corresponding to the rotation of the steering wheel, may be rotated to generate a counter electromotive force or phase voltage, turn on the power supply 150 based on the counter electromotive force or phase voltage, and supply power to turn on the MDPS 160, as described with reference to FIG. 1, at step S104.

Then, the turned-on MDPS 160 or the internal control unit of the MDPS may detect a relative rotation angle of the steering wheel 110 using the motor position sensor (not illustrated) at step S105.

At this time, step S105 for detecting the relative rotation angle of the steering wheel 110 may be repeated until the operation of the steering wheel 110 is completed, at step S106.

When the manual operation for the steering wheel 110 is completed (Yes at step S106), for example, when no additional operation is performed after the steering wheel was operated, the MDPS 160 or the internal control unit of the MDPS may calculate the final steering angle and store the calculated the final steering angle in a memory (or internal memory of the MDPS) at step S107.

For reference, in order to determine whether the operation of the steering wheel 110 is completed, the MDPS 160 may determine whether no input torque is applied while the steering angle is not changed for a designated time or more.

After storing the final steering angle in the memory or the internal memory of the MDPS, the MDPS 160 or the internal control unit of the MDPS may be turned off at step S108.

FIG. 3 is a flowchart for describing a method for estimating a steering angle using a relative rotation angle of the motor without a steering angle sensor, in FIG. 2.

As illustrated in FIG. 3, the MDPS 160 in accordance with the present exemplary embodiment may be based on the supposition that the zero-point setting was established and a driving voltage was applied to the MDPS 160, at step S201.

As described above, the MDPS 160 or the internal control unit of the MDPS in accordance with the present exemplary embodiment may continuously detect a relative rotation angle of the steering wheel 110 using the motor position sensor (not illustrated), while the MDPS 160 or the internal control unit of the MDPS is turned on, at step S202.

Then, the MDPS 160 or the internal control unit of the MDPS may calculate the final steering angle from the final relative rotation angle obtained by adding the current relative rotation angle to the previous rotation angle (previous relative rotation angle+current relative rotation angle) at step S203.

In the present exemplary embodiment, however, when the steering wheel 110 is manually operated, a slight time delay may occur even though the MDPS 160 is immediately turned on to estimate or calculate the final steering angle. Thus, a slight error may occur in the estimated or calculated final steering angle.

Therefore, the MDPS 160 or the internal control unit of the MDPS may perform steering angle correction during driving at step S204.

At this time, the steering angle correction method during driving can be performed by a publicly known correction method. Thus, the detailed descriptions of thereof are omitted herein.

In the present exemplary embodiment, when a slight error occurs in the final steering angle due to a slight time delay that occurs while the MDPS 160 is turned on to estimate or calculate the final steering angle, the slight error of the final steering angle can be removed through the steering angle correction which is performed during driving. However, the slight error of the final steering angle can be corrected through another method, which will be described with reference to FIG. 4.

Figure 4:
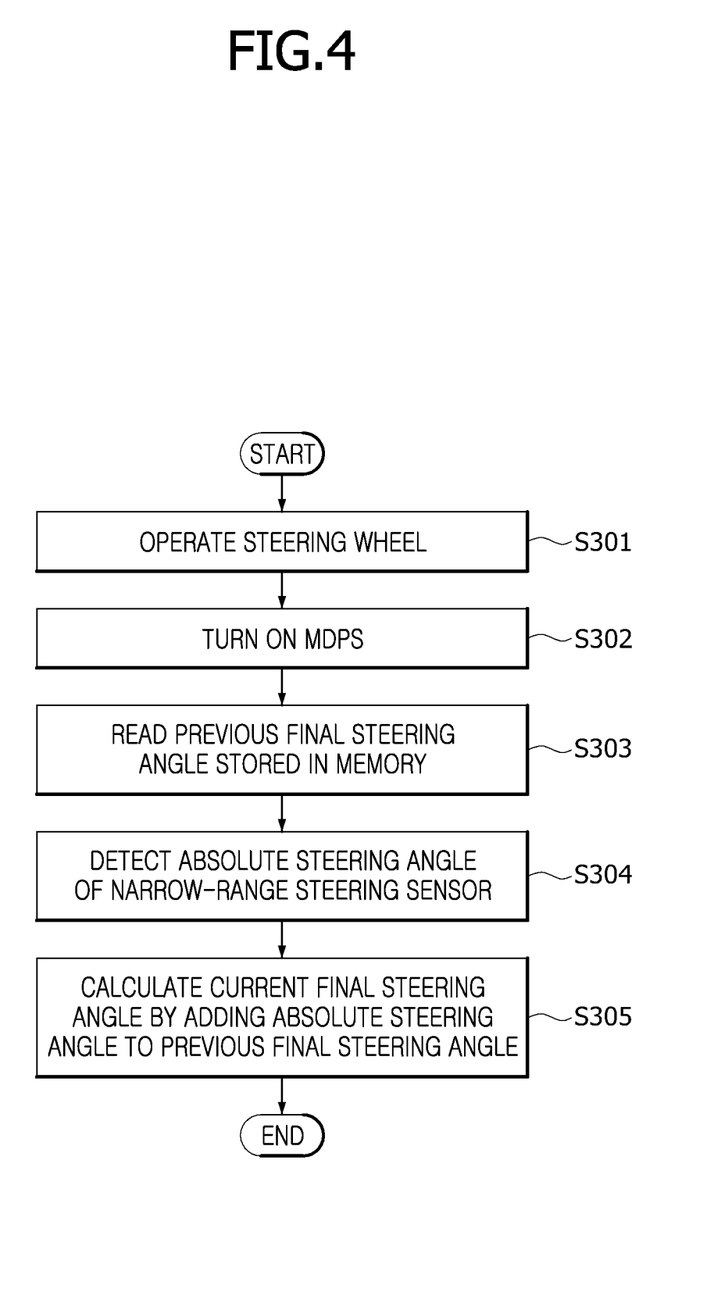
FIG. 4 is a flowchart for describing a method for estimating a steering angle of MDPS in accordance with another exemplary embodiment of the present invention.

FIG. 4 is a flowchart for describing a method for estimating a steering angle of MDPS in accordance with another exemplary embodiment of the present invention.

The present exemplary embodiment may be based on the supposition that a narrow-range steering angle sensor is mounted on the MDPS 160, instead of the existing full-range steering angle sensor. The narrow-range steering angle sensor refers to a sensor capable of detecting an absolute steering angle in a narrower range of approximately 40 degrees or less than the full-range steering angle sensor.

As described above, when the ignition of the vehicle is turned off, the MDPS 160 may be turned off. As illustrated in FIG. 4, when the steering wheel 110 is manually operated at step S301 while the MDPS 160 is turned off, the motor 120 rotated in connection with the steering wheel 110 or the motor of the MDPS corresponding to the rotation of the steering wheel may be rotated to generate a counter electromotive force or phase voltage, turn on the power supply 150 based on the counter electromotive force or phase voltage, and supply power to the MDPS 160 or the internal control unit of the MDPS to turn on the MDPS 160, at step S302.

Then, the turned-on MDPS 160 or the internal control unit of the MDPS may read the previous final steering angle stored in the memory or the internal memory of the MDPS at step S303, the previous final steering angle indicating the final steering angle stored when the MDPS is turned off.

The MDPS 160 or the internal control unit of the MDPS may detect an absolute steering angle through the narrow-range steering angle sensor (not illustrated), the absolute steering angle indicate a steering angle of the steering wheel which is rotated by the manual operation until the MDPS 160 or the internal control unit of the MDPS is turned on.

Then, the MDPS 160 or the internal control unit of the MDPS may calculate the current final steering angle by adding the absolute steering angle to the previous final steering angle read from the memory or the internal memory of the MDPS at step S305, the absolute steering angle indicating an absolute steering angle which is varied while the MDPS is turned on.

Then, when no additional operation is performed for a preset time or more after the steering wheel 110 was operated, the MDPS 160 or the internal control unit of the MDPS may store the calculated final steering angle in the memory or the internal memory of the MDPS.

In another exemplary embodiment, the current final steering angle can be restored based on the absolute steering angle in the case of a general key cycle in which a driver turns on a vehicle through an ignition. However, if the steering wheel 110 is rotated with the battery removed from the vehicle, the MDPS 160 or the internal control unit of the MDPS cannot detect the rotation of the steering wheel 110.

Thus, when the MDPS 160 is turned on, a separate check circuit may be used to check whether the battery was removed or discharged in the previous key cycle in which the vehicle was turned on or off through the ignition. When the corresponding event, for example, the removal or discharge of the battery occurs, the restoring operation of the steering wheel 110 may be disabled or a weak restoring force (or a restoring force smaller than a normal restoring force) may be applied, and the zero point of the absolute steering angle may be reset at a point of time that the vehicle enters the straight driving mode (that is, the zero point of the absolute steering angle may be reset through the steering angle correction method during driving). Then, the restoring operation of the steering wheel 110 may be enabled or the restoring force may be restored to the existing normal restoring force.

At this time, the check circuit which is added to check whether the vehicle battery was removed or discharged may include a circuit in which the flag of a memory is set to 0 while the battery power is supplied, and then changed to 1 when the battery power is not supplied due to the removal or discharge of the battery.

Figure 5:
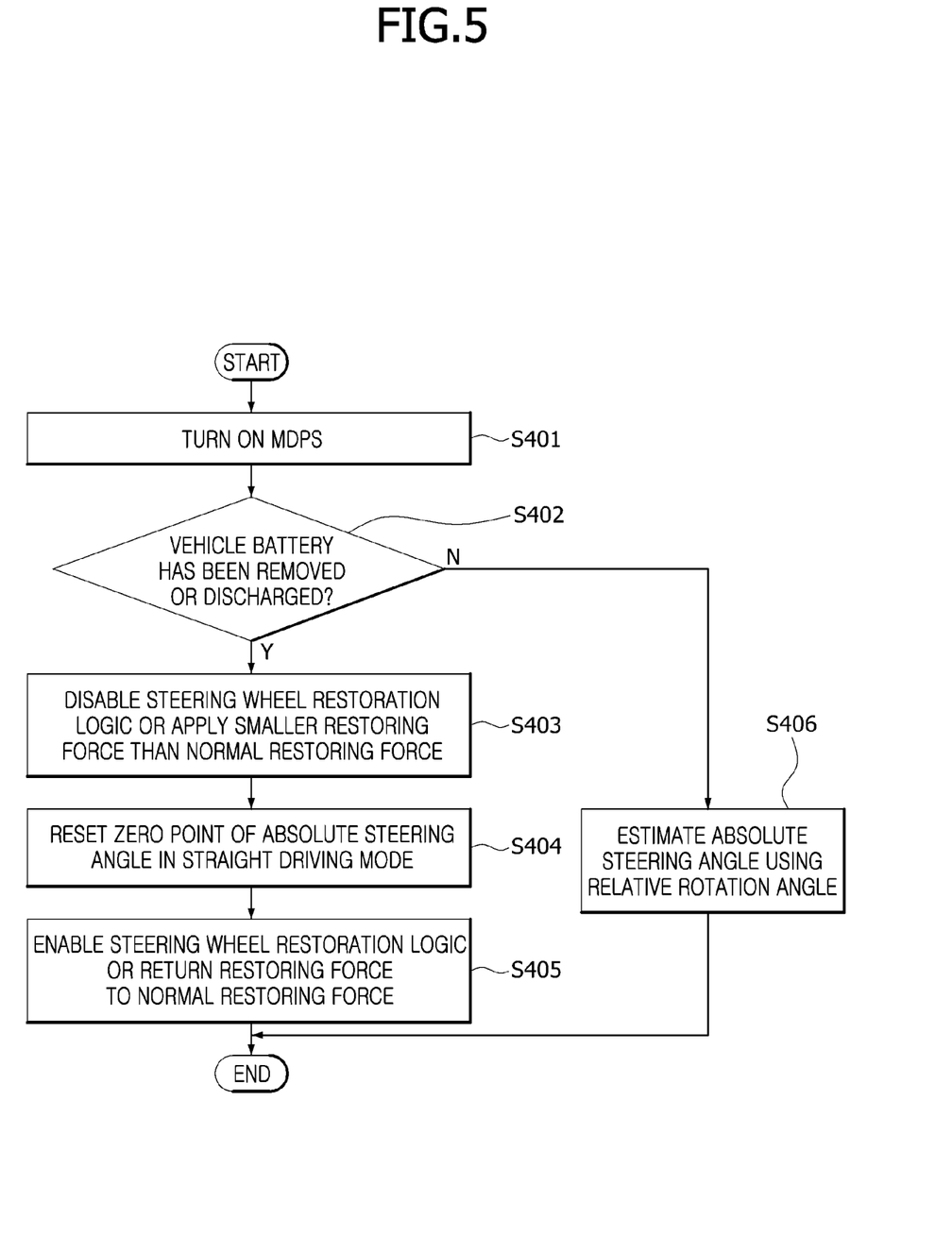
FIG. 5 is a flowchart for describing a method for determining whether to estimate a steering angle of MDPS in accordance with an exemplary embodiment of the present invention.

FIG. 5 is a flowchart for describing a method for determining whether to estimate a steering angle of the MDPS in accordance with the exemplary embodiment of the present invention.

When the vehicle battery is removed or discharged as described above, a steering angle cannot be estimated through the method in accordance with the present exemplary embodiment. That is, the estimated steering angle may have no reliability. In this case, the restoration logic of the steering wheel 110 may be disabled or a weak restoring force (or a restoring force smaller than a normal restoring force) may be applied for safety.

Therefore, when the MDPS 160 or the internal control unit of the MDPS is turned on by power supplied thereto at step S401, the MDPS 160 or the internal control unit of the MDPS may check whether the vehicle battery has been removed or previously discharged through the battery check circuit (not illustrated), at step S402.

When the check result S402 indicates that the vehicle battery has been removed or previously discharged (Yes), the MDPS 160 or the internal control unit of the MDPS may disable the restoring operation of the steering wheel 110 or apply a weak restoring force or a steering force smaller than the normal restoring force, at step S403.

Then, the MDPS 160 or the internal control unit of the MDPS may reset the zero point of the absolute steering angle at a point of time that the vehicle enters the straight driving mode or reset the zero point of the absolute steering angle using the steering angle correction method during driving, at step S404.

Then, the MDPS 160 or the internal control unit of the MDPS may enable the restoring operation of the steering wheel 110 or return the restoring force to the existing normal restoring force, at step S405.

When the check result S402 indicates that the vehicle battery has never been removed or discharged (No), the MDPS 160 may estimate an absolute steering angle using a relative rotation angle at step S406, as described with reference to FIGS. 2 to 4.

Figure 6:
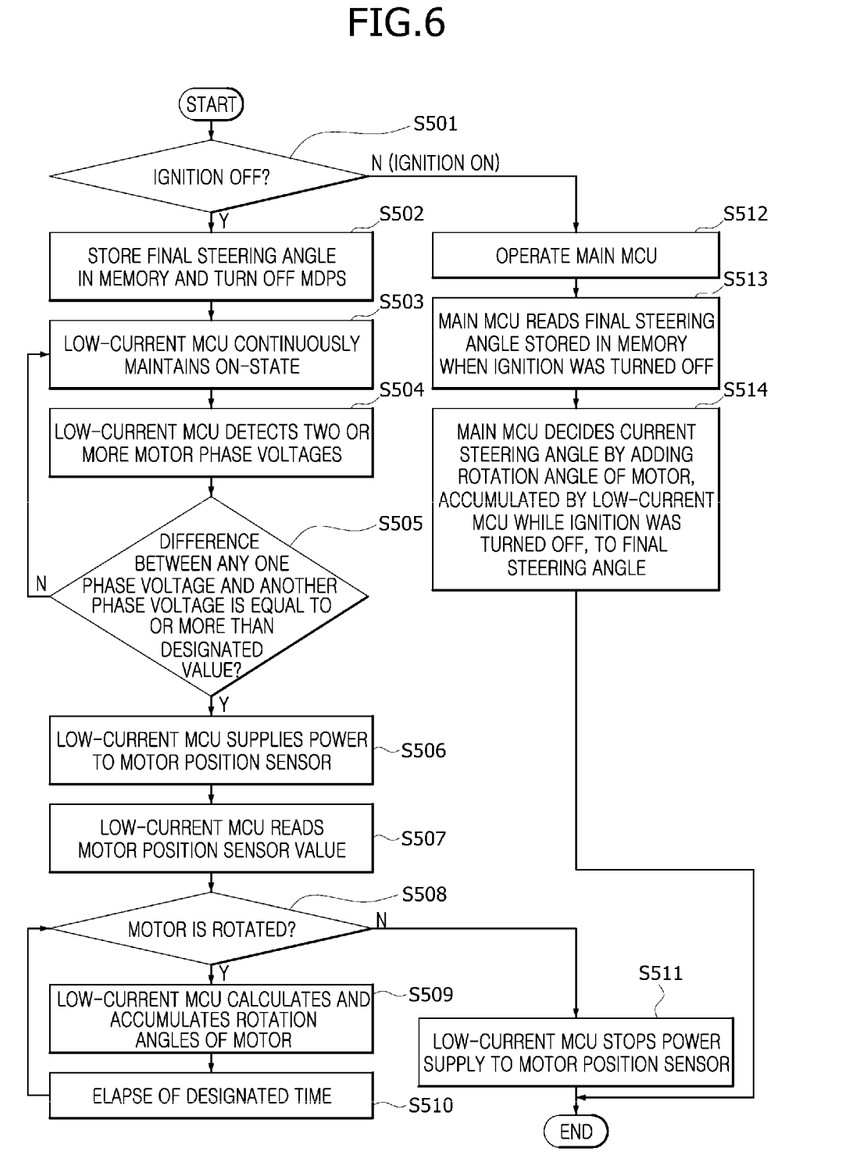
FIG. 6 is a flowchart for describing a method for estimating a steering angle of MDPS in accordance with still another exemplary embodiment of the present invention.

FIG. 6 is a flowchart for describing a method for estimating a steering angle of MDPS in accordance with still another exemplary embodiment of the present invention.

As illustrated in FIG. 6, when a driver (or user) turns the ignition key to turn off the ignition after finishing the steering at step S501, the MDPS 160 may store the final steering angle in the memory (the internal memory of the MDPS) and then be turned off at step S502.

At this time, although the MDPS 160 is turned off, a low-current motor control unit (MCU) (not illustrated), which consumes a small amount of current, may not be turned off, but continuously maintained in an on-state at step S503.

The low-current MCU may indicate a low-current MCU which can be operated even by a micro-current and is one of control units included in the MDPS 160. However, the present invention is not limited thereto, but a low-current MCU included in another electronic control unit (ECU) (not illustrated) in the vehicle may be used.

Therefore, the low-current MCU may read (or detect) two or more phase voltages of the motor at step S504, and check whether a difference between any one phase voltage and another phase voltage is equal to or greater than a designated value, at step S505. When the difference between any one phase voltage and another phase voltage is equal to or more than the designated value (Yes at step S505), the low-current MCU supplies power to the motor position sensor (not illustrated) at step S506.

That is, when the difference between any one phase voltage and another phase voltage is equal to or more than the designated value, the low-current MCU may determine that the steering wheel is operated. Therefore, the low-current MCU may read a value of the motor position sensor at step S507, and check whether the motor 120 is rotated, based on the sensor value, at step S508.

Therefore, when the motor 120 is rotated (Yes at step S508), the low-current MCU calculates and accumulates rotation angles of the motor 120 at step S509.

On the other hand, when the motor 120 is not rotated (at step S510 & No at step S508), the low-current MCU may turn off the motor position sensor by stopping power supply to the motor position sensor at step S511.

FIG. 6 illustrates that the procedure is ended after step S511. Substantially, however, steps S501 to S511 may be repeated until the driver turns the ignition key to turn on the ignition.

When the driver turns the ignition key to turn on the ignition, a main MCU (not illustrated) may be operated at step S512. The main MCU may read the final steering angle which has been stored in the memory (the internal memory of the MDPS) when the ignition was turned off, at step S513. The low-current MCU may decide the current steering angle by adding the rotation angles of the motor, which the low-current MCU has accumulated while the ignition was turned off, to the final steering angle, at step S514.

The main MCU may correspond to a control unit (not illustrated) included in the MDPS 160.

At this time, steps S501 to S515 may be repeated whenever the driver turns the ignition key to turn on or off the ignition.

The exemplary embodiments described with reference to FIGS. 2 to 6 may be independently performed. Substantially, however, the embodiments can be combined with each other.

In accordance with the present exemplary embodiment, although a steering angle of the MDPS is estimated with no steering angle sensor mounted, the steering angle may not be significantly different from an absolute steering angle detected through a steering angle sensor. Although a slight error occurs when the steering angle is estimated, steering angle estimation errors may not be accumulated because correction is performed during driving. As a result, the absolute steering angle can be stably estimated.

Furthermore, when an absolute steering angle cannot be estimated by the method in accordance with the present embodiment, the restoring force of the steering wheel may be adjusted to improve the stability of the vehicle.

The above described method descriptions and the process flow diagrams are provided as illustrative examples and are not intended to require or imply that the steps of the various exemplary embodiments must be performed in the order presented. Instead, the order of steps in the foregoing exemplary embodiments may be performed in any order. Words such as "after", "then," "next," etc. are merely intended to aid the reader through description of the methods.

The various illustrative logical blocks, modules, circuits, and algorithm steps described in connection with the exemplary embodiments may be implemented as electronic hardware, computer software, or combinations of both. In order to describe the interchangeability of hardware and software, various illustrative features, blocks, modules, circuits, and steps have been described above in terms of their general functionality. Whether such functionality is implemented as hardware or software depends upon the particular application and design constraints for the overall system. A person of ordinary skill in the art may implement the functionality in various ways for each particular application without departing from the scope of the present invention.

The hardware used to implement the various illustrative logics, logical blocks, modules, and circuits described in connection with the exemplary embodiments disclosed herein may be implemented or performed with a general purpose processor, a digital signal processor (DSP) an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disc includes optically reproducible data such as a compact disc (CD), laser disc, optical disc, digital versatile disc (DVD), and blu-ray disc. Disk includes magnetically reproducible data such as a floppy disk. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An apparatus for estimating a steering angle of a Motor Driven Power Steering (MDPS), comprising:
    a motor of an MDPS;
    an amplifier configured to amplify a specific level of counter electromotive force to a preset level and output the amplified voltage, the specific level of counter electromotive force being generated by the motor in response to manual operation of a steering wheel;
    a switch configured to be turned on by the amplified voltage outputted from the amplifier;
    a power supply configured to be turned on by the switch and supply power to the MDPS; and
    a control unit of the MDPS configured to be driven by the supplied power and estimate a steering angle of the steering wheel, which is manually operated,
    wherein the switch comprises an electronic switch which is not turned on by a smaller voltage than the voltage level outputted from the amplifier.

2. The apparatus of claim 1, wherein the amplifier is configured to receive power from a battery while the MDPS is turned off.

3. The apparatus of claim 1, wherein, while the MDPS is turned on, the control unit of the MDPS is configured to continuously detect a relative rotation angle of the steering angle using a motor position sensor that detects a motor position of the MDPS, and estimate a final steering angle based on a final value of the detected relative rotation angle and a previous value of the final steering angle stored in a memory.

4. The apparatus of claim 1, wherein, in response to completion of the manual operation of the steering wheel, the control unit of the MDPS stores the estimated final steering angle in a memory, and is then turned off.

5. The apparatus of claim 4, wherein, in response to a change of the steering angle being equal to or less than a preset value for a preset time or more or a torque change being equal to or less than a preset value, the control unit of the MDPS determines that the manual operation of the steering wheel is completed.

6. A method for estimating a steering angle of a Motor Driven Power Steering (MDPS), comprising:
    detecting, by a control unit of the MDPS, a relative rotation angle of an MDPS motor rotated in connection with a steering wheel using a motor position sensor, as the control unit of the MDPS is turned on by power supplied thereto in response to the steering wheel being operated while the MDPS is turned off;
    estimating, by the control unit of the MDPS, a final steering angle and storing the estimated final steering angle in a memory based on the detected relative rotation angle, when the operation of the steering wheel is completed; and
    turning off the control unit of the MDPS after the final steering angle is stored in the memory.

7. The method of claim 6, wherein, in order to turn on the control unit of the MDPS, an amplifier of an apparatus for estimating a steering angle of MDPS amplifies a counter electromotive force generated by the MDPS motor to a preset level or more and outputs the amplified voltage to a switch, the switch is turned on by the amplified voltage and turns on a power supply, and the power supply supplies power to the MDPS.

8. The method of claim 6, wherein, in order to estimate the final steering angle, while the MDPS is turned on, the control unit of the MDPS continuously detects the relative rotation angle of the steering wheel using the motor position sensor that detects the motor position of the MDPS, and estimates the final steering angle based on a final value of the detected relative rotation angle and a previous value of the final steering angle stored in the memory.

9. The method of claim 6, wherein, in response to a change of the steering angle being equal to or less than a preset value for a preset time or more or a torque change being equal to or less than a preset value, the control unit of the MDPS determines that the operation of the steering wheel is completed.

10. The method of claim 6, wherein:
after the control unit of the MDPS is turned on by power supplied thereto, the control unit of the MDPS checks whether a vehicle battery has been removed or discharged, and disables a restoring operation of the steering wheel or applies a smaller restoring force than a normal restoring force when the vehicle battery has been removed or discharged; and
in response to the absolute steering angle of the MDPS being reset, the control unit enables the restoring operation of the steering wheel or returns the restoring force to the normal restoring force.

11. The method of claim 10, wherein:
in order to check whether the vehicle battery has been removed or discharged, the control unit of the MDPS receives information on whether the battery has been discharged from another system connected through communication in a vehicle, or the MDPS comprises a separate check circuit therein; and
the check circuit comprises a circuit in which a flag of a memory is set to a first value while battery power is supplied, and then changed to a second value when the battery power is not supplied due to a removal or discharge of the battery.

12. A method for estimating a steering angle of a Motor Driven Power Steering (MDPS), comprising:
reading, by a control unit of the MDPS, a previous final steering angle stored in a memory when the MDPS was turned off, as the control unit of the MDPS is turned on by power supplied thereto in response to the steering wheel being operated while the MDPS is turned off;
detecting, by the control unit of the MDPS, an absolute steering angle of the steering wheel rotated until the MDPS is turned on, through a narrow-range steering angle sensor; and
calculating, by the control unit of the MDPS, the current final steering angle by adding the detected absolute steering angle to the previous final steering angle read from the memory.

13. The method of claim 12, wherein the narrow-range steering angle sensor comprises a sensor capable of detecting an absolute steering angle in a narrower range than a full-range steering angle sensor.

14. A method for estimating a steering angle of a Motor Driven Power Steering (MDPS), comprising:
reading, by a low-current motor control unit (MCU), two or more motor phase voltages, the low-current MCU continuously maintaining an on-state even while the MDPS is turned off by turn-off of an ignition of a vehicle;
checking, by the low-current MCU, whether a difference between any one phase voltage and another phase voltage is equal to or more than a designated value;
reading, by the low-current MCU, a motor position sensor value by supplying power to a motor position sensor, when the check result indicates that the voltage difference is equal to or more than the designated value;
calculating and accumulating, by the low-current MCU, rotation angles of the motor according to the motor position sensor value; and
deciding, by a main MCU, a current steering angle by adding the rotating angle of the motor, accumulated by the low-current MCU while the ignition was turned off, to the final steering angle which has been stored in a memory when the ignition was turned off, the main MCU being operated as the ignition is turned on.

15. The method of claim 14, wherein, when the difference between any one phase voltage and another phase voltage is equal to or greater than the designated value, the low-current MCU determines that a steering wheel is operated.

16. The method of claim 14, wherein when the motor is not rotated for a predefined time, the low-current MCU turns off the motor position sensor by stopping power supply to the motor position sensor.

* * * * *